United States Patent
Shigemoto et al.

(10) Patent No.: US 10,458,437 B2
(45) Date of Patent: Oct. 29, 2019

(54) AIR BLOWER

(71) Applicant: Sharp Kabushiki Kaisha, Osaka-shi, Osaka (JP)

(72) Inventors: Naoyuki Shigemoto, Osaka (JP); Nobuo Sasaki, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 504 days.

(21) Appl. No.: 15/039,902

(22) PCT Filed: Sep. 1, 2014

(86) PCT No.: PCT/JP2014/072946
§ 371 (c)(1),
(2) Date: May 27, 2016

(87) PCT Pub. No.: WO2015/111246
PCT Pub. Date: Jul. 30, 2015

(65) Prior Publication Data
US 2016/0377093 A1    Dec. 29, 2016

(30) Foreign Application Priority Data

Jan. 23, 2014  (JP) .................................. 2014-010655
May 21, 2014  (JP) .................................. 2014-105520

(51) Int. Cl.
*F04D 29/70*  (2006.01)
*F04D 17/16*  (2006.01)
(Continued)

(52) U.S. Cl.
CPC .............. *F04D 29/703* (2013.01); *A01M 1/06* (2013.01); *A01M 1/08* (2013.01); *A01M 1/106* (2013.01);
(Continued)

(58) Field of Classification Search
CPC .. F04D 29/281; F04D 29/4226; F04D 29/703; F04D 25/08; A01M 1/04; A01M 1/06; A01M 1/08; A01M 1/106
See application file for complete search history.

(56) References Cited

U.S. PATENT DOCUMENTS 3,152,420 A * 10/1964 Pawl ....................... A01M 1/08
                                                              43/113
4,856,226 A *  8/1989 Taylor .................... A01M 1/08
                                                              43/111
(Continued)

FOREIGN PATENT DOCUMENTS

CN          2102393 U    4/1992
CN          2218267 Y    1/1996
(Continued)

OTHER PUBLICATIONS

Official Communication issued in International Patent Application No. PCT/JP2014/072946, dated Nov. 18, 2014.
(Continued)

*Primary Examiner* — Jason D Shanske
*Assistant Examiner* — Aye S Htay
(74) *Attorney, Agent, or Firm* — ScienBiziP, P.C.

(57) ABSTRACT

An air blower including a casing having an intake port and a discharge port an air-blowing fan disposed inside the casing to take in air through the intake port and discharge air from the discharge port; and a filter filtering the air taken in through the intake port, wherein an insect trapping part trapping an insect is disposed in a ventilation path between the intake port and the filter.

10 Claims, 5 Drawing Sheets

(51) Int. Cl.
*F04D 29/42* (2006.01)
*A01M 1/06* (2006.01)
*B01D 46/00* (2006.01)
*B01D 46/10* (2006.01)
*B01J 21/06* (2006.01)
*B01J 35/00* (2006.01)
*C01G 23/047* (2006.01)
*F04D 25/08* (2006.01)
*F04D 29/28* (2006.01)
*A01M 1/08* (2006.01)
*A01M 1/10* (2006.01)
*A01M 1/14* (2006.01)

(52) U.S. Cl.
CPC ........... *A01M 1/14* (2013.01); *B01D 46/0032* (2013.01); *B01D 46/0038* (2013.01); *B01D 46/10* (2013.01); *B01J 21/063* (2013.01); *B01J 35/004* (2013.01); *C01G 23/047* (2013.01); *F04D 17/16* (2013.01); *F04D 25/08* (2013.01); *F04D 29/281* (2013.01); *F04D 29/4226* (2013.01)

(56) References Cited

U.S. PATENT DOCUMENTS

| | | | | |
|---|---|---|---|---|
| 5,222,322 A | * | 6/1993 | Mastromonaco | A01M 1/026 43/139 |
| 5,255,468 A | * | 10/1993 | Cheshire, Jr. | A01M 1/023 43/112 |
| 5,370,576 A | * | 12/1994 | Krofchalk | B60H 1/00464 454/143 |
| 2004/0128904 A1 | * | 7/2004 | Chen | A01M 1/023 43/139 |

FOREIGN PATENT DOCUMENTS

| | | |
|---|---|---|
| CN | 200975372 Y | 11/2007 |
| JP | 03-001029 A | 1/1991 |
| JP | 10-227503 A | 8/1998 |
| JP | 2958002 B1 | 10/1999 |
| JP | 2007-289122 A | 11/2007 |
| JP | 2009-066466 A | 4/2009 |
| JP | 4378663 B1 | 12/2009 |
| JP | 5188282 B2 | 4/2013 |
| JP | 5320532 B2 | 10/2013 |
| WO | 2008/111232 A1 | 9/2008 |

OTHER PUBLICATIONS

肖品東 (Xiào Pǐn Dōng), "Industrial techniques of nano fumed calcium carbonate", Chemical Industry Press, Industrial Facility and Information Process Publishing Center, May 2004, 7 pages.

* cited by examiner

AIR BLOWER

CROSS-REFERENCE TO RELATED APPLICATIONS

This application is the national phase under 35 U.S.C. § 371 of PCT International Application No. PCT/JP2014/072946 which has International filing date of Sep. 1, 2014 and designated the United States of America.

FIELD

The technology herein relates to an air blower which captures dust contained in taken-in air and blows out the air.

BACKGROUND AND SUMMARY

Various substances such as allergic substances including pollen dust, mites and mold as well as viruses float in the air inside a room, which cause allergic symptoms or infections. Particularly in recent years, as houses are made to be highly airtight, contaminants are likely to stay in a room. While traditional houses had been ventilated naturally by opening room windows as necessary, it may be difficult these days to take in the outside air because of air pollution, pollen allergy and so forth.

In view of such circumstances, an air blower having an air purifying function of purifying the air in a room, e.g., an air purifier, has recently been widespread.

Furthermore, viral infections transmitted by mosquitoes have caused problems worldwide. An insect trap has therefore been proposed which traps insects by an adhesive sheet or air suction power.

An insect trap having a suction mechanism blows out fine dust from scales or dead bodies of insects to the outside the product through a discharge port. Even an insect trap without a suction mechanism causes scales or dust to be raised by a moving insect and scattered through a gap or an opening, from which such an insect invaded, to the outside the product.

The present disclosure has been made in view of the above circumstances, and aims to prevent dust such as scales or dead bodies of trapped insects from being scattered to the outside.

According to a first aspect of the present disclosure, there is provided an air blower comprising: a casing having an intake port and a discharge port; an air-blowing fan disposed inside the casing to take in air through the intake port and discharge air from the discharge port; and a filter filtering the air taken in through the intake port, wherein an insect trapping part trapping an insect is disposed in a ventilation path between the intake port and the filter.

According to the present disclosure, insects are trapped by the insect trapping part located at the ventilation path between the intake port and the filter, to prevent scales or dead bodies of trapped insects from being scattered to the outside while having the function of an air blower.

According to a second aspect of the present disclosure, an attracting part attracting an insect is disposed in the ventilation path.

According to the present disclosure, the attracting part is disposed at the ventilation path to attract insects into the insect trapping part, so as to improve the accuracy of trapping.

According to a third aspect of the present disclosure, a net-like part is disposed between the filter and the insect trapping part.

According to the present disclosure, the net-like part is disposed between the filter and the insect trapping part, which can reduce insects intruding into the filter and can suppress clogging of the filter.

According to a fourth aspect of the present disclosure, the intake port is formed in the shape of a slit.

According to the present disclosure, since the intake port is formed in a slit shape, the wind speed at the time of suctioning can be maintained high, which can prevent a once-intruded insect from escaping again to the outside through the intake port.

According to a fifth aspect of the present disclosure, the attracting part is constituted by a light source, and the peripheral part of the intake port is constituted by a translucent member.

According to the present disclosure, the peripheral part of the intake port is constituted by a translucent member, light is emitted from the intake port and the periphery thereof, which may more easily attract insects and improve the accuracy of trapping.

According to a sixth aspect of the present disclosure, the casing includes a recess, the intake port is located at the bottom of the recess, and at least one side surfaces of the recess facing each other is inclined with respect to the casing such that the distance between the side surfaces facing each other is shorter at the side of the intake port than the distance at a side opposite to the intake port.

According to the present disclosure, as the opening width of the recess is longer toward the opposite side of the intake port (outer side), insects are more easily attracted toward the intake port side (inner side), thereby improving the accuracy of trapping.

According to a seventh aspect of the present disclosure, the casing includes: two facing parts facing each other; and a side surface part located between the two facing parts, and the side surface part is formed as a curved surface protruding toward a side where one of the facing parts is located or as an inclined surface with an outer surface of the side surface part oriented toward a side where one of the facing parts is located, and the intake port is located at the side surface part.

According to the present disclosure, as the intake port is formed at the side surface, the intake port is opened toward one facing part side. Accordingly, light or sound wave emitted by the attracting part located on the ventilation path is discharged through the intake port to the one facing part side, which can alleviate excessive brightness from the light at the other facing surface part side. Moreover, noisy sound from the sound wave may also be alleviated.

According to an aspecto of the present disclosure, an insect trapping part is located at a ventilation path between an intake port and a filter, which may prevent scales or dead bodies of trapped insects from being scattered to the outside while having the function of an air blower.

The above and further objects and features will more fully be apparent from the following detailed description with accompanying drawings.

DETAILED DESCRIPTION OF NON-LIMITING EXAMPLE EMBODIMENTS (Embodiment 1)

Figure 1:
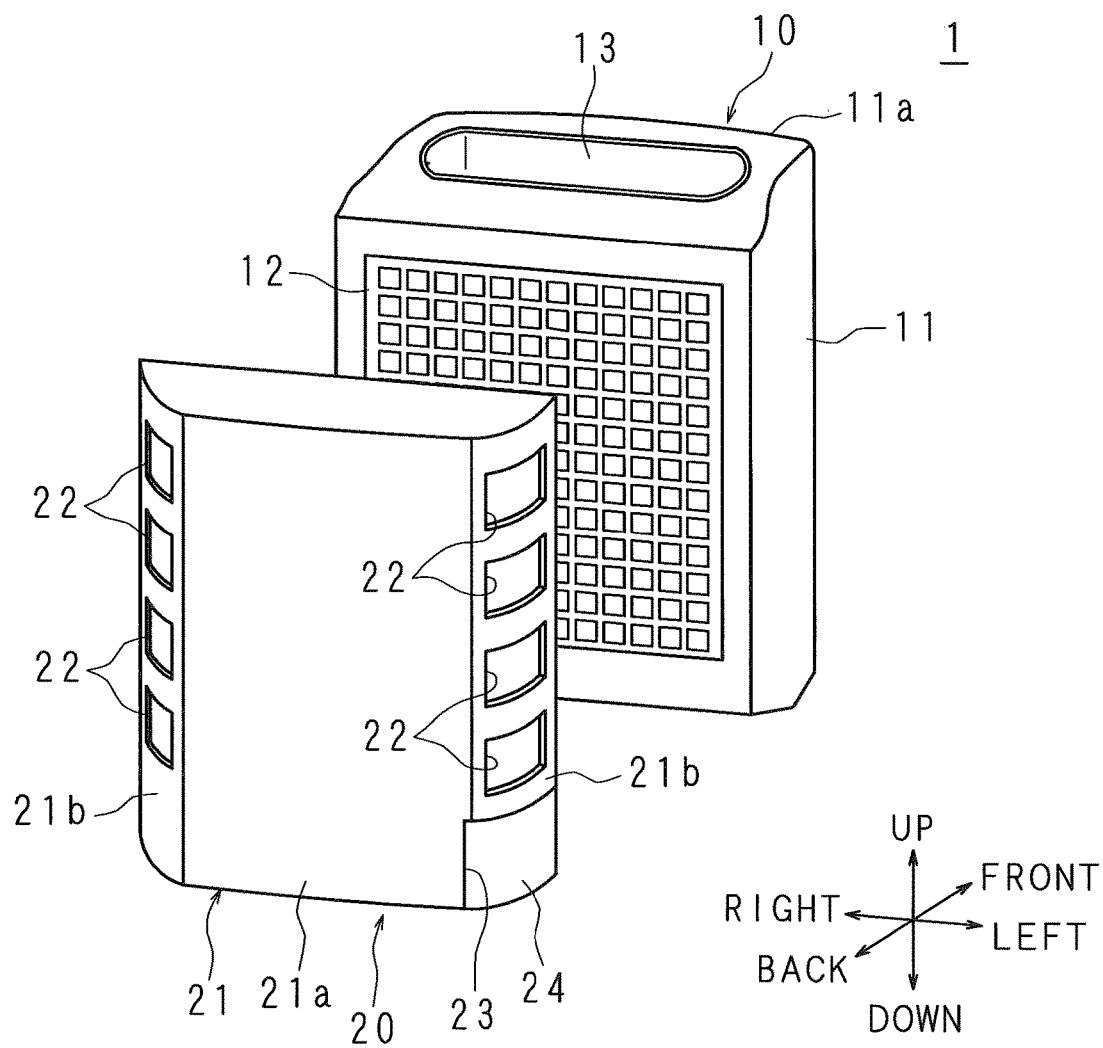
FIG. 1 is an exploded perspective view schematically illustrating an air blower according to Embodiment 1.
Figure 2:
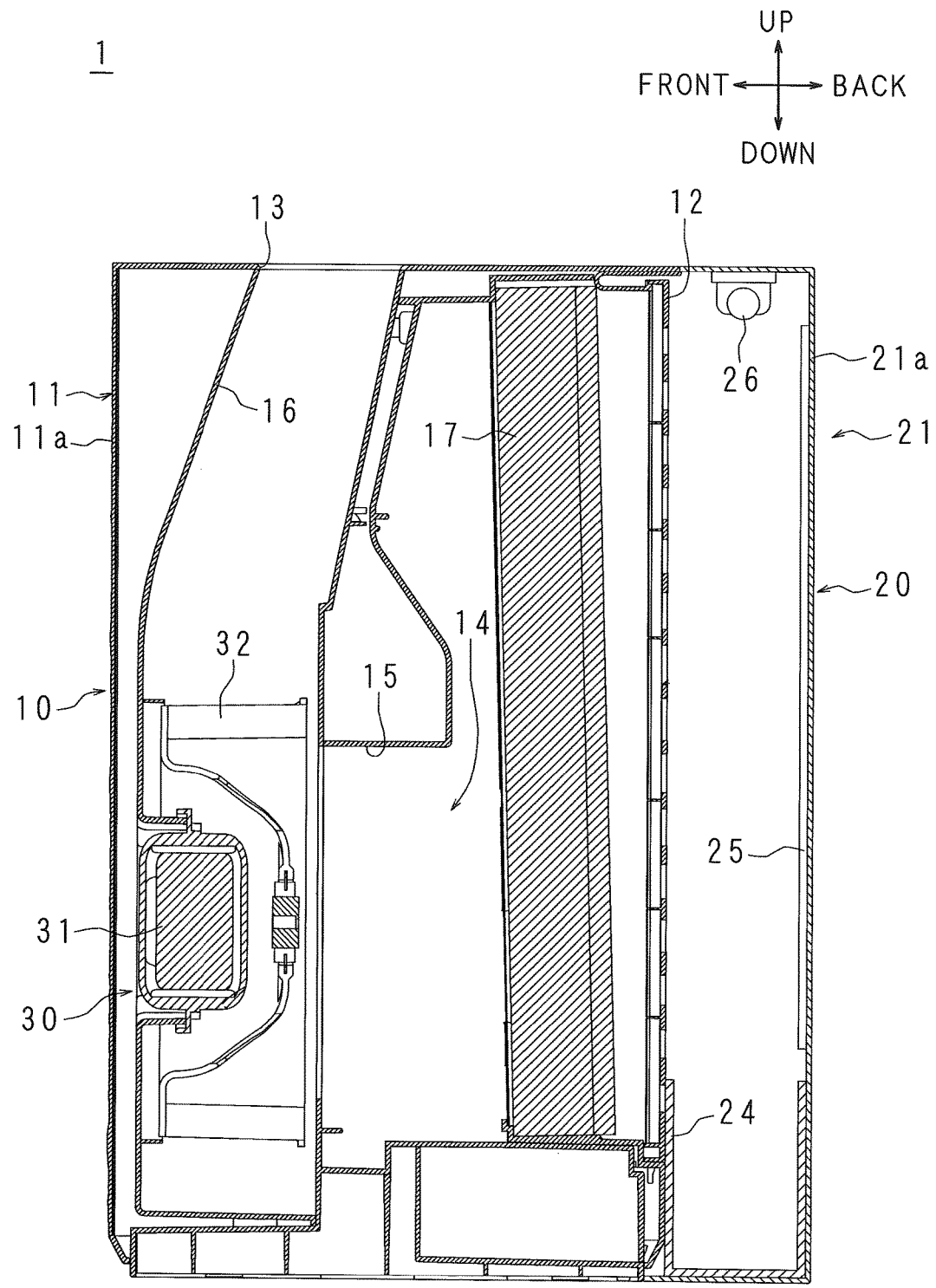
FIG. 2 is a vertical section view schematically illustrating an air blower.

The present invention will be described below with reference to the drawings illustrating an air blower 1 according to Embodiment 1. FIG. 1 is an exploded perspective view schematically illustrating the air blower 1, and FIG. 2 is a vertical section view schematically illustrating the air blower 1. It is to be noted that the up (upper), down (lower), left, right, front and back in the description below correspond to the up, down, left, right, front and back indicated in the drawings.

The air blower 1 comprises an air-blowing unit 10 and an insect trapping unit 20. The air-blowing unit 10 includes a casing 11 having a rectangular parallelepiped shape. A discharge port 13 which blows out the air is located at the upper surface of the casing 11, and a net-like part 12 is formed at the back surface of the casing 11. The net-like part 12 is provided with multiple openings, each of which is formed in a square shape with the dimension of one side being approximately 0.5 mm, for example. A filter 17 for filtering the air is located inside the casing 11 so as to face the net-like part 12.

The filter 17 is so configured as to be capable of trapping fine dust (dust having a dimension of two to three microns, for example). The filter 17 is constituted by a filter element fabricated from, for example, a melt-blown non-woven fabric made of polyester to which an electret process (electrostatic process) is applied (a so-called high efficiency particulate air (HEPA) filter), and absorbs dust by static electricity.

An L-shaped air trunk 14 is formed at the front side of the filter 17. The air trunk 14 includes a front-back air trunk 15 extending in the front-back direction and an up-down air trunk 16 continuous to the front end of the front-back air trunk 15 while extending in the up-down (vertical) direction. The front-back air trunk 15 faces the lower part of the filter 17. The upper end of the up-down air trunk 16 continues to the discharge port 13.

An air-blowing fan 30 is located at the lower end (a portion connected to the front-back air trunk 15) of the up-down air trunk 16. The air-blowing fan 30 includes a motor 31 which rotates around the front-back axis, and a blade part 32 connected to the rotary shaft of the motor 31. As the motor 31 rotates, the air is suctioned through the net-like part 12, filter 17 and front-back air trunk 15, and passes through the up-down air trunk 16 and discharge port 13 to be blown out.

Figure 3:
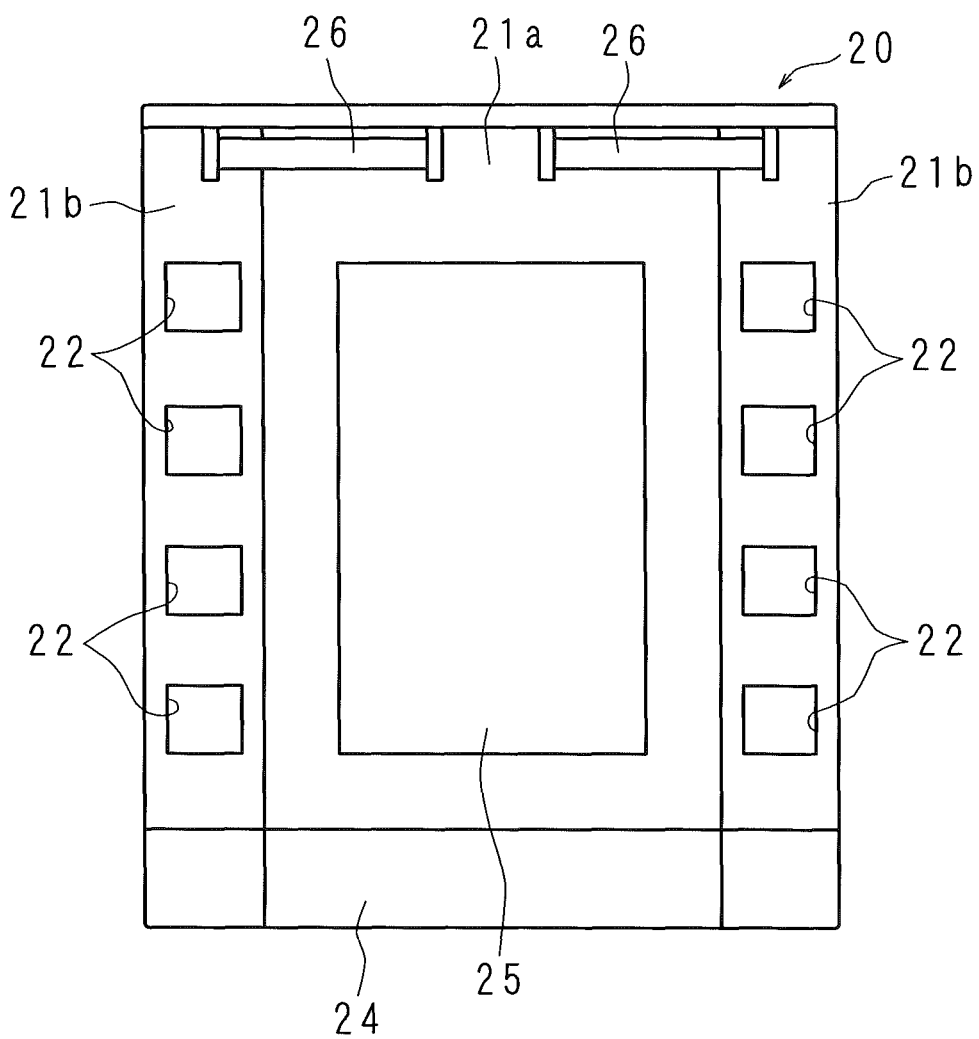
FIG. 3 is a front view schematically illustrating an insect trapping unit.

The insect trapping unit 20 is attached to the back surface of the air-blowing unit 10 so as to be detachable. FIG. 3 is a front view schematically illustrating the insect trapping unit 20.

The insect trapping unit 20 includes a casing 21 having the shape of a rectangular parallelepiped with an opened front surface. A back surface part 21a (one facing part) of the casing 21 is positioned to be opposed to a front surface part 11a (the other facing part) of the casing 11 of the air-blowing unit 10. Side surface parts 21b and 21b at the left and right of the casing 21 each has a curved surface protruding toward diagonally backward left or diagonally backward right (toward the back surface part 21a side). Four intake ports 22, 22, 22 and 22 are vertically aligned at each of the side surface parts 21b and 21b at the left and right of the casing 21. Each of the intake ports 22 is opened toward the back surface part 21a side so as to conform to the shape of the left and right side surface parts 21b. It is to be noted that each of the left and right side surface parts 21b may be formed as an inclined surface with its outer surface oriented toward the back surface part 21a side. The number of the intake ports 22 is not limited to four but may also be less than or more than four. Furthermore, the intake ports 22 may also be formed at either one of the left and right side surface parts 21b of the casing 21. Moreover, the upper surface (side surface) of the casing 21 may be formed as a curved surface protruding toward the back surface part 21a side or formed as an inclined surface with its outer surface oriented toward the back surface part 21a side, and the intake port 22 may be located at the upper surface.

An opening 23 is formed at the lower end of the left side surface of the casing 21, while a dust collecting box 24 for collecting fallen dust is inserted into the opening 23. The dust collecting box 24 is long in the horizontal (left-right) direction with the upper side thereof opened. The dust colleting box 24 may be pulled out from the opening 23. The user may pull out the dust collecting box 24 as necessary to take out the collected dust or dead bodies of insects. Alternatively, the net-like part 12 of the air blower 1 may be provided with a brush for cleaning the net-like part, which moves in coordination with the dust collecting box 24 in directions corresponding to the attachment/detachment directions of the dust collecting box 24 at the time of attachment or detachment thereof, and thereby the dust adhered to the net-like part 12 falls into the dust collecting box 24 to be captured therein.

Inside the casing 21, an adhesive sheet 25 is provided at the back surface of the casing 21. At the upper surface of the casing 21, two light sources 26 and 26 are disposed. It is to be noted that the number of the light sources 26 is not limited to two but may also be less than or more than two. The light source 26 may alternatively be formed on the air-blowing unit 10 side, not necessarily on the insect trapping unit 20 side. As the light source 26, though a fluorescent lamp with its peak wavelength set at approximately 360 nm may be employed for example, the light source 26 may have any other configurations that attract insects, not limited to the fluorescent lamp. For example, the light source 26 which emits visible light rays may also be employed. Moreover, the light source is not limited to a lamp, but may also be a light emitting diode, for example. Since nocturnal mosquitoes are easily attracted by near-ultraviolet light, the light source 26 emitting near-ultraviolet light may preferably be used.

When the light source 26 is turned on, the light from the light source 26 is emitted through the intake port 22 to the outside. An insect reacts to and is attracted by the light from the light source 26, and enters inside the casing 21 of the insect trapping unit 20 through the intake port 22. The entered insect approaches the back surface of the insect trapping unit 20 so as to stop and rest thereon. Since the adhesive sheet 25 is provided at the back surface, the insect that touched the adhesive sheet 25 can no longer move. That is, the insect is trapped irrespective of the suction power of the air-blowing fan 30. While the adhesive sheet 25 is located at the back surface of the insect trapping unit 20, it may also be located at another place. For example, the adhesive sheet 25 may also be located at the bottom surface of the insect trapping unit 20 (bottom surface of the dust collecting box 24). Instead of the adhesive sheet 25, an adhesive net formed in a net-like shape may be used and disposed at the net-like part 12, or the net-like part 12 itself may be formed as an adhesive net.

As described above, since the intake port 22 is substantially opened toward the back surface part 21*a* side, the light from the light source 26 will not travel forward. The air blower 1 is often installed such that the back surface part 21*a* thereof faces a wall in a room, which can prevent the user from directly looking at the light from the light source 26. Moreover, since the intake port 22 is opened in the diagonally backward direction, the light from the light source 26 also travels in the left and right directions. Accordingly, compared to the case where the intake port 22 is opened straight backward, the light can be emitted to a wider area, thereby efficiently attracting insects. In the case where the back surface part 21*a* is located close to the wall, the light output from the intake port 22 is projected onto the wall in the backward as well as left and right of the air blower 1, so that the wall may be used as if it is a large screen or a lamp, which can more easily and efficiently attract insects.

When the air-blowing fan 30 is driven, the air is suctioned from the intake port 22, passes through the net-like part 12, the filter 17 and the air trunk 14, and is blown out from the discharge port 13. It is to be noted that the path between the intake port 22 and the discharge port 13 serves as a ventilation path.

As the air flows, dust from the scales or dead bodies of insects move toward the air-blowing unit 10 side, where the scales or dust are trapped by the filter 17. This can prevent the scales or dust from being scattered to the outside through the discharge port 13.

Note that a photocatalyst (carbon dioxide generating part) containing titanium dioxide may be provided around the light source 26. When the photocatalyst is irradiated with ultraviolet rays, active oxygen is generated on the surface of the photocatalyst, and the active oxygen decomposes an organic substance (formaldehyde, for example) to change it into carbon dioxide and water. Since mosquitoes have a habit of flying toward a place with high density of carbon dioxide, they are more easily attracted into the insect trapping unit 20.

In place of the photocatalyst containing titanium dioxide, a photocatalyst containing zinc oxide, nickel oxide, copper oxide, zinc sulfide, cadmium sulfide, mercury sulfide, cadmium selenide or the like may also be used. In place of the photocatalyst, another carbon dioxide generating part may also be provided. For example, dry ice, a carbon dioxide generating part using fermentation or a carbon dioxide generating part using lime and hydrochloric acid may alternatively be provided.

The light source 26 may also be configured so as to be turned off once in every predetermined period of time. For example, the light source 26 may be turned off for several minutes every time one hour elapses. Moreover, such a configuration may also be possible that the wind power may be changed or the air blow may be stopped after a predetermined period of time elapses. Since mosquitoes react to varying stimulations, such a configuration allows the insect trapping unit 20 to more easily attract mosquitoes.

Furthermore, in place of or in addition to the light source 26, a sound generating part may be provided which generates a sound wave of a predetermined frequency for attracting insects (sound wave generated by an insect rubbing their wings together). Male mosquitoes tend to be attracted by wingbeat frequencies of female mosquitoes.

As described above, the intake port 22 is opened toward the back surface part 21*a* side, which can make the sound of the sound wave generating part less likely to travel forward. That is, direct transmission of such sound to the user may be alleviated. Moreover, as the intake port 22 is opened in the diagonally backward direction, the sound also travels in the left and right directions, and thus may be emitted to a wider area compared to the case where the intake port 22 is opened straight backward, thereby efficiently attracting insects.

Furthermore, in place of or in addition to the light source 26, a heater which heats the inside of the insect trapping unit 20 to approximately twenty-five to forty degrees Celsius may also be included. Mosquitoes are easily attracted into the insect trapping unit 20 since they generally have a habit of flying toward a higher temperature.

The exterior of the air-blowing unit 10 or the insect trapping unit 20 may be colored with a color which attracts insects, e.g., black. Such coloring allows the insect trapping unit 20 to easily attract insects. Note that mosquitoes tend to be attracted by black.

The user may detach the insect trapping unit 20 from the air-blowing unit 10 and replace the adhesive sheet 25 with a new adhesive sheet 25. Inside the insect trapping unit 20, a slide part which may be externally attached or detached may be disposed at the back surface of the casing 21, and the slide part may be provided with the adhesive sheet 25. In such a case, the user may detach the plate from the insect trapping unit 20, replace the adhesive sheet 25 located at the slide part with a new adhesive sheet 25, and attach the slide part to the insect trapping unit 20 or attach another slide part provided with the new adhesive sheet 25 to the insect trapping unit 20.

The means for trapping insects is not limited to the adhesive sheet 25, but an adhesive part having another shape such as a net-like shape or a convexo-concave shape may also be employed, or an adhesive coating material may directly be applied to the back surface of the casing 21 and used as an adhesive part. The portion where the adhesive part is located is not limited to the back surface of the casing 21 of the insect trapping unit 20. For example, an adhesive part may also be located at the bottom surface of the casing 21 or the back surface of the casing 11 of the air-blowing unit 10. Furthermore, in place of the adhesive sheet 25, a net for trapping insects may also be disposed inside the casing 21 of the insect trapping unit 20. Moreover, a maze structure for trapping insects, e.g., a cranked pathway, may also be provided inside the casing 21 and the intake port 22 may be connected to the pathway.

It is to be noted that a deodorant filter or an ion generator may further be added to the air blower 1, so that the air blower 1 may be used as an air purifier having an additional function other than collecting dust. Moreover, a cooler may be added so that the air blower 1 may be used as an air cooler, or a heat exchanger may be added so that the air blower 1 may be used as an air conditioner.

(Embodiment 2)

Figure 4:
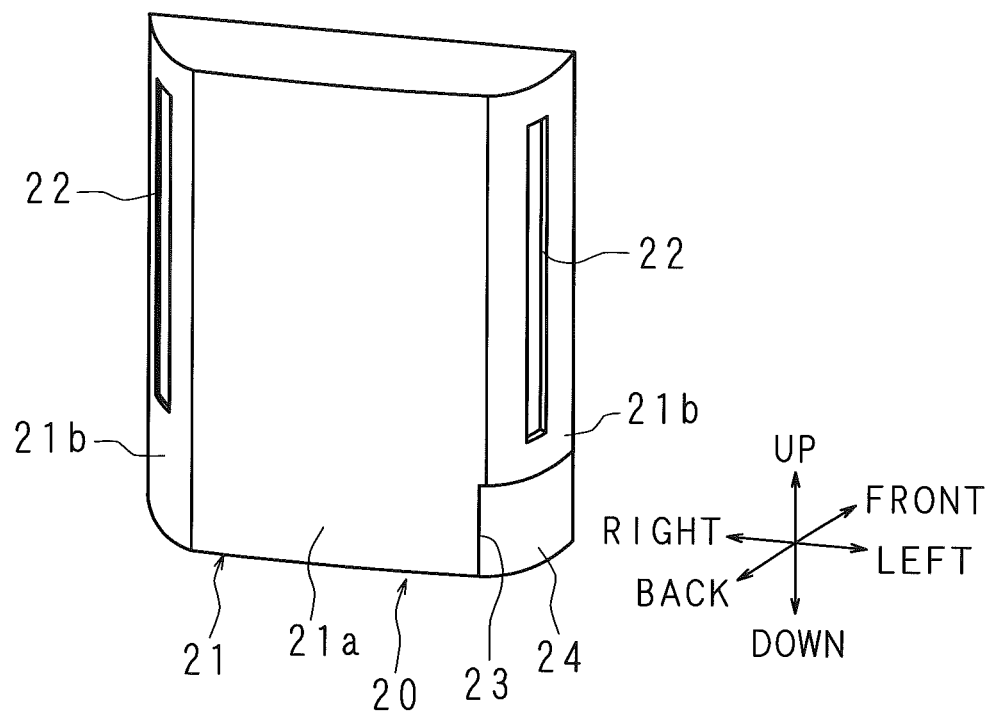
FIG. 4 is a perspective view schematically illustrating an insect trapping unit in an air blower according to Embodiment 2.

The present invention will now be described below with reference to the drawing illustrating an air blower 1 according to Embodiment 2. FIG. 4 is a perspective view schematically illustrating an insect trapping unit 20.

An intake port 22 having the shape of a vertically-extending slit is formed at each of left and right side surface parts 21*b* and 21*b* of the insect trapping unit 20. For example, the intake port 22 is designed to have the horizontal dimension of 15 cm and the vertical dimension of 30 cm. As the intake port 22 is formed in the slit shape, the opening area may be made smaller while the wind speed at suctioning may be higher. This can prevent an insect entered into the insect trapping unit 20 from escaping to the outside through the intake port 22. Mosquitoes tend to have hard times escaping to the outside at the wind speed of 2 m/s or more.

Components of the air blower 1 according to Embodiment 2 that are similar to those in Embodiment 1 are denoted by the same reference numbers and are not described in detail.

(Embodiment 3)

Figure 5:
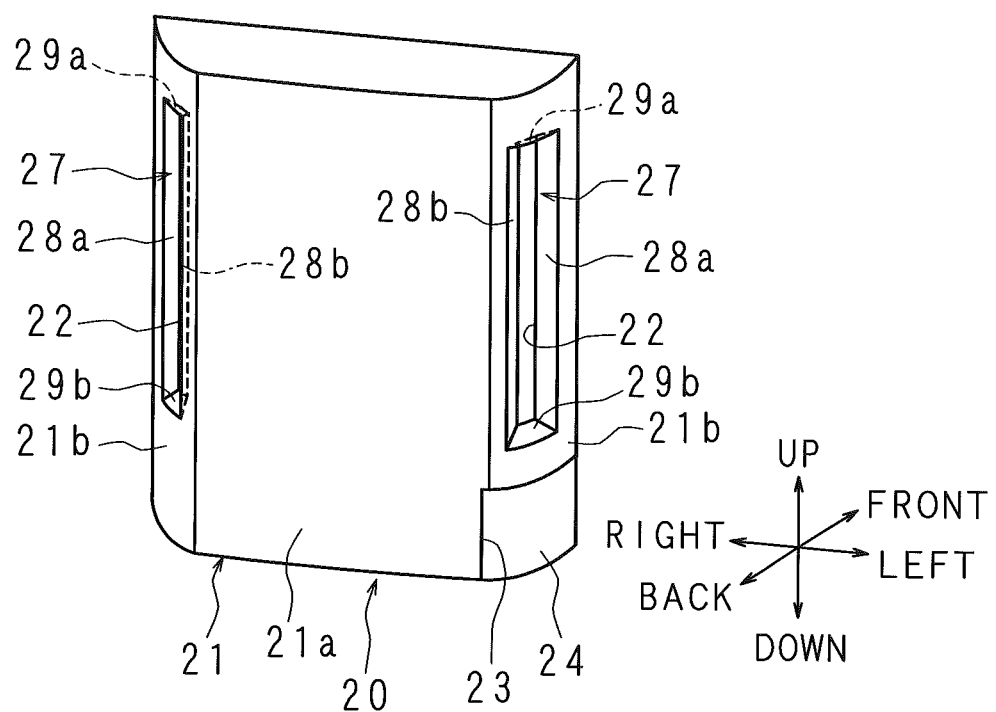
FIG. 5 is a perspective view schematically illustrating an insect trapping unit in an air blower according to Embodiment 3.

The present invention will be described below with reference to the drawing illustrating an air blower 1 according to Embodiment 3. FIG. 5 is a perspective view schematically illustrating an insect trapping unit 20.

A recess 27 having a vertically-elongated shape with a trapezoidal section is formed at each of left and right side surface parts 21b and 21b in a casing 21 of the insect trapping unit 20. The bottom of the recess 27 is opened so as to form a slit-shaped intake port 22. For example, the intake port 22 is designed to have a horizontal dimension of 15 cm and the vertical dimension of 30 cm.

The recess 27 includes two vertical side surfaces 28a and 28b extending in the vertical direction and facing each other and includes the upper side surface 29a and the lower side surface 29b connecting the upper and lower ends of the two vertical side surfaces 28a and 28b, respectively. The vertical side surfaces 28a, 28b, upper side surface 29a and lower side surface 29b are inclined with respect to the left and right side surface parts 21b and 21b at an angle of approximately forty-five degrees such that the lateral width and the vertical length (the distance between the vertical side surfaces 28a and 28b facing each other as well as the distance between the upper side surface 29a and the lower side surface 29b facing each other) at the inner side (the intake port 22 side) is smaller than the lateral width and the vertical length at the outer side (the side opposite to the intake port 22). As for the depth direction of the recess 27, the dimension for each of the vertical side surfaces 28a, 28b, upper side surface 29a and lower side surface 29b is approximately 3 cm, for example. Furthermore, the vertical side surfaces 28a, 28b, upper side surface 29a and lower side surface 29b are formed of a translucent member.

As the slit-shaped intake port 22 is formed at the bottom of the recess 27, the insect trapping unit 20 can prevent an insect entered therein from escaping to the outside through the intake port 22. Mosquitoes tend to have hard times escaping to the outside at the wind speed of 2 m/s or more. Moreover, light is emitted to the outside not only from the intake port 22 but also from the vertical side surfaces 28a, 28b, upper side surface 29a and lower side surface 29b positioned peripheral to the intake port 22, so that a function of attracting insects may be enhanced. Furthermore, as the side surfaces (vertical side surfaces 28a, 28b, upper side surface 29a and lower side surface 29b) are inclined such that the bottom part (intake port 22) side of the recess 27 is narrowed, attracted insects may easily be directed into the intake port 22.

It is to be noted that not only the vertical side surfaces 28a, 28b, upper side surface 29a and lower side surface 29b but also peripheral portions to these surfaces may also be made of a translucent member. While all the vertical side surfaces 28a, 28b, upper side surfaces 29a and lower side surfaces 29b are inclined in Embodiment 3, it is not necessary for all the side surfaces to be inclined as long as at least one side surface is inclined.

The components of the air blower 1 according to Embodiment 3 that are similar to those in Embodiment 1 or 2 are denoted by the same reference numbers and are not described in detail.

The embodiments disclosed herein are to be construed as illustrative and not restrictive in all aspects. The technical features disclosed in the embodiments can be combined with one another, and the scope of the invention is intended to embrace all changes that fall within metes and bounds of the claims, or equivalence of such metes and bounds thereof. While mosquitoes are described as an example of insects, insects other than mosquitoes such as flies or the like, for example, may naturally be included in the object to be trapped in the present invention.

In relation to the embodiments described above according to the present invention, the following matters will further be disclosed.

In an air blower according to the present invention comprising a casing 11, 21 having an intake port 22 and a discharge port 13, an air-blowing fan 30 disposed inside the casing 11, 21 to take in air through the intake port 22 and discharge air from the discharge port 13, and a filter 17 filtering the air taken in through the intake port 22, an insect trapping part 25 trapping an insect is disposed in a ventilation path between the intake port 22 and the filter 17.

In the air blower according to the present invention, an attracting part 26 attracting an insect is disposed in the ventilation path.

In the air blower according to the present invention, a net-like part 12 is disposed between the filter 17 and the insect trapping part 25.

In the air blower according to the present invention, the intake port 22 is formed in a shape of a slit.

In the air blower according to the present invention, the attracting part 26 is constituted by a light source 26, and a peripheral part of the intake port 22 is constituted by a translucent member.

The casing 21 includes a recess 27, the intake port 22 is located at the bottom of the recess 27, and at least one side surfaces 28a, 28b, 29a and 29b of the recess 27 facing each other is inclined with respect to the casing 21 such that the distance between the side surfaces 28a, 28b, 29a and 29b facing each other is shorter at the side of the intake port than the distance at the side opposite to the intake port 22.

In the air blower according to the present invention, the casing 11, 21 includes: two facing parts 11a, 21a facing each other; and a side surface part 21b located between the two facing parts, and the side surface part is formed as a curved surface protruding toward a side where one of the facing parts is located or as an inclined surface with an outer surface of the side surface part oriented toward a side where one of the facing parts is located and the intake port 22 is located at the side surface part 21b.

The invention claimed is:

1. An air blower, comprising:
 a casing having an intake port and a discharge port;
 an air-blowing fan disposed inside the casing to take in air through the intake port and discharge air from the discharge port; and
 a filter filtering the air taken in through the intake port, wherein
 an insect trapper trapping an insect is disposed in a ventilation path between the intake port and the filter the casing comprises:
 a first casing holding the air-blowing fan; and
 a second casing attached to the first casing in a detachable manner, and the insect trapper is held in the second casing in a replaceable manner.

2. The air blower according to claim 1, wherein an insect attractor attracting an insect is disposed in the ventilation path.

3. The air blower according to claim 1, wherein a net part is disposed between the filter and the insect trapper.

4. The air blower according to claim 1, wherein the intake port is formed in a shape of a slit.

5. The air blower according to claim 1, wherein
the insect attractor is constituted by a light source, and
a peripheral part of the intake port is constituted by a translucent member.

6. The air blower according to claim 1, wherein
the casing includes a recess,
the intake port is located at a bottom of the recess, and
at least one of the two side surfaces of the recess facing each other is inclined with respect to the casing such that a distance between the two side surfaces facing each other is shorter at a side of the intake port than the distance at a side opposite to the intake port.

7. The air blower according to claim 1, wherein
the casing includes:
two facing parts facing each other; and
a side surface part located between the two facing parts, and wherein
the side surface part is formed as a curved surface protruding toward a side where one of the facing parts is located or as an inclined surface with an outer surface of the side surface part oriented toward a side where one of the facing parts is located and
the intake port is located at the side surface part.

8. The air blower according to claim 7, wherein a peak wavelength of the light source is set at approximately 360 nm or the light source emits near-ultraviolet light.

9. The air blower according to claim 1, wherein
a front part with an opening of the second casing is attached to a back surface of the first casing, and
the insect trapper is put on an inside surface of a back part of the second casing.

10. The air blower according to claim 1, wherein the casing is colored with black.

\* \* \* \* \*